United States Patent
Koskan et al.

(10) Patent No.: US 9,206,062 B2
(45) Date of Patent: *Dec. 8, 2015

(54) METHODS TO RECOVER AND RECLAIM HYDROCARBONS OR HYDROPHOBIC SUBSTANCES IN AN AQUEOUS ENVIRONMENT

(71) Applicant: GLOBAL GREEN PRODUCTS LLC, Dover, DE (US)

(72) Inventors: Larry P. Koskan, Orland Park, IL (US); Abdul R. Meah, Bridgeview, IL (US); Jon Vander Wonde, Chicago, IL (US)

(73) Assignee: GLOBAL GREEN PRODUCS LLC, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/100,320

(22) Filed: Dec. 9, 2013

(65) Prior Publication Data

US 2014/0144842 A1 May 29, 2014

Related U.S. Application Data

(63) Continuation of application No. 13/164,642, filed on Jun. 20, 2011, now Pat. No. 8,628,669.

(60) Provisional application No. 61/356,140, filed on Jun. 18, 2010.

(51) Int. Cl.
| | |
|---|---|
| *C02F 1/52* | (2006.01) |
| *C02F 1/56* | (2006.01) |
| *C02F 1/68* | (2006.01) |
| *C02F 1/28* | (2006.01) |
| *C02F 101/32* | (2006.01) |

(52) U.S. Cl.
CPC ............... *C02F 1/5272* (2013.01); *C02F 1/285* (2013.01); *C02F 1/56* (2013.01); *C02F 1/681* (2013.01); *C02F 2101/32* (2013.01)

(58) Field of Classification Search
CPC ........................................................ C02F 1/56
See application file for complete search history.

(56) References Cited

U.S. PATENT DOCUMENTS

| | | | |
|---|---|---|---|
| 3,518,183 A | 6/1970 | Evans | |
| 4,941,978 A | 7/1990 | Gabrick | |
| 4,969,774 A | 11/1990 | Arseneault et al. | |
| 5,104,548 A | 4/1992 | Gabrick | |
| 5,116,513 A * | 5/1992 | Koskan et al. | 210/698 |
| 5,399,350 A | 3/1995 | Potter | |
| 5,492,881 A | 2/1996 | Diamond | |
| 5,891,937 A | 4/1999 | Berg et al. | |
| 6,056,805 A | 5/2000 | Litwin et al. | |
| 6,110,323 A | 8/2000 | Marsland | |
| 6,344,519 B1 | 2/2002 | Rink et al. | |
| 6,383,609 B1 | 5/2002 | Annergren et al. | |
| 6,391,120 B1 | 5/2002 | Silva | |

* cited by examiner

*Primary Examiner* — Tony G Soohoo
*Assistant Examiner* — Peter Keyworth
(74) *Attorney, Agent, or Firm* — Seager, Tufte & Wickhem, LLP

(57) ABSTRACT

The present invention provides useful biodegradable and environmentally friendly cost effective methods for oil recovery and reclamation from oil spills and chemical spills. More particularly, methods to recover and reclaim hydrocarbons or hydrophobic substances in an aqueous environment.

20 Claims, 5 Drawing Sheets

US 9,206,062 B2

METHODS TO RECOVER AND RECLAIM HYDROCARBONS OR HYDROPHOBIC SUBSTANCES IN AN AQUEOUS ENVIRONMENT

CROSS REFERENCE TO RELATED APPLICATION

This application is a continuation of U.S. application Ser. No. 13/164,642, filed Jun. 20, 2011, which claims the benefit of U.S. Provisional Application No. 61/356,140, filed on Jun. 18, 2010, under 35 U.S.C. §119(e), the entire disclosures of which are herein incorporated by reference.

FIELD OF THE DISCLOSURE

The present disclosure relates generally to chemical spill remediation, and more particularly, to methods to recover and reclaim hydrocarbons or hydrophobic substances in an aqueous environment.

BACKGROUND

The recovery of unwanted material, such as spilled hydrocarbons on water, sand or other structures, has been an environmental concern for many decades. Oil spilled or leaked from tankers, vessels, docks and offshore wells are just a few of the many examples that continue to threaten our environment. Spills and leaks create havoc with birds and other wildlife that inhabit the water and surrounding areas. As long as the demand for petroleum products exists, spills and leaks will continue to occur, thus requiring prompt attention and clean up.

Oil spills and leaks occur on bodies of water of all types, including those containing fresh, brackish, or salt (sea) water. Recovery of oil may also be required on beaches and coastal lands. In yet other situations, it may be required to recover oil from a source, such as the side of a vessel. The unwanted material may be any hydrocarbon material, including, but not limited to, crude oil, residual fuel oils, and distilled products such as gasoline, kerosene-type jet fuel, diesel fuel, heating oil, etc. The term "oil spill" is used herein to refer to a pool or mass of oil floating on a body of water, and without distinction as to the source of the oil or the manner in which it was released.

Several processes and techniques have been used in the past to facilitate the clean-up of oil spills. Hydrocarbon fuel, oil, and chemical spills occur frequently on a multitude of surfaces. On land, clay sorbents, cellulose or sphagnum products, surfactants, or other bioremedial methods to name a few are used in these situations with the intent of cleaning up the spill in a quick fashion or bioremediating a contaminated soil surface over time. On the water, spills present unique problems and require responders to assess each spill quickly and choose among a variety of spill response products and approaches. Factors such as cold water or broken ice conditions can change the physical state of crude oils making broad application of chemical dispersants more difficult and ineffective.

Various techniques and materials have been used as absorbents in helping to minimize contamination resulting from hydrocarbon fuel, oil, and chemical spills. Absorbents generally function by attracting materials to their pore spaces. Adsorbents such as polypropylene fibers function by hydrophobic nature in water and oleophilic attraction of the oil to wick into the surface area of these example fibers.

Furthermore, various elastomeric materials of the prior art are disclosed regarding A-B-A triblock elastomers for hydrocarbon absorption during environmental cleanup on water. The A-B-A elastomers currently utilized include Styrene-Butadiene-Styrene, SBS or Styrene-Isoprene-Styrene, SIS (U.S. Pat. No. 3,518,183), Styrene-Butadiene-Styrene/Ethylene-Propylene Diene Monomer, SBS/EPDM (U.S. Pat. No. 6,344,519), Styrene-Ethylene-Butylene-Styrene, SEBS (U.S. Pat. Nos. 4,941,978 and 5,104,548), or Styrene-Ethylene-Propylene-Styrene, SEPS (U.S. Pat. No. 6,056,805).

Many of the prior art copolymers used in spill cleanup, due to their absorbent properties, are of the SEBS type copolymer. A SEBS type copolymer is a polystyrene-poly(ethylene/butylene)-polystyrene copolymer. Examples are KRATON G-1650 or KRATON G-1651 or KRATON G-1652 made by Shell Chemical Company. The KRATON G series, produced by anionic polymerization, are block polymers in which the elastomeric portion of the molecule is a saturated olefin polymer of the type ethylene/butylenes. Copolymers of these example types are not biodegradable or environmentally friendly.

Current available products for spill control include clay, kaolin, illite, bentonite, diatomite, hectorite, montmorillonite, attapulgite, silica, silica sand, polypropylene, sodium olyacrylate/polyacrylamides, vermiculite, gypsum, limestone, metal oxides, asphalt, fiberglass, diatomaceous earth, perlite and other materials. Such materials, while satisfactory in function, suffer from certain drawbacks. Many such products contain silica, which poses a hazard to humans. In addition, most such materials are not biodegradable, which is a factor that can limit the options for disposal of the used sorbent material.

Several organic spill control products are described in the art. Examples of such materials include natural fibers such as grass, pre-cooked cereal kernels, sawdust, cellulose, and peat. U.S. Pat. No. 5,492,881 purports to describe a cellulose based sorbent system, where the cellulose has been treated with an additive to render it both hydrophobic and oleophilic so it will selectively remove oil from water. U.S. Pat. No. 4,969,774 purports to describe the use of pre-cooked and puffed cereals for oil removal. Another document, U.S. Pat. No. 5,399,350, purports to disclose a particulate milled seed material in which the lipids have been removed through solvent extraction and wherein the material is designed to remove and disperse oil from open water and solid surfaces. The composition is a solvent-extracted proteinaceous material derived from grain products having oil sorptive properties. Also, U.S. Pat. No. 5,492,881 purports to describe the use of diatomaceous earth, clay, silica, corncob, peatmoss, perlite, polypropylene, sawdust, cellulose, polystyrene, vermiculite, peat and cork to absorb liquids. This composition is taught as a general absorbent; in this document, it is stated that materials that absorb both water and oil are undesirable. U.S. Pat. No. 5,891,937 purports to disclose the use of corn stalks, husks, cobs, and kernels as carriers. U.S. Pat. No. 6,110,323 purports to disclose the use of delignified waste from hulls, straw, stover, and shells as a carrier. Other carriers are purportedly disclosed in U.S. Pat. Nos. 6,383,609 and 6,391,120. Generally, other biodegradable materials such as peat moss, sawdust, hair, feathers, cotton, cork, starch, bagasse, seeds, seed hulls, and other seed components have also been proposed. Materials such as these tend to combine with the oil and render recovery and reclamation more difficult.

In recent years there has been an ever increasing awareness of the devastating environmental damage that can be caused by oil spills. It is well recognized that an extremely important aspect of minimizing damage from an oil spill is the prompt containment and collection of the spilled oil. Effective collection of spilled oil ideally involves the absorption of oil in some absorption medium that can be easily raked or otherwise picked up from the surface upon which the oil has spilled. Nevertheless, despite intensive research and testing, the only absorption substances which are at all suitable for use in cleaning up oil spills involve significant defects or difficulties.

Some conventional oil absorbents currently in commercial use are made from polypropylene. Polypropylene absorbs hydrocarbons but is hydrophobic. That is, it is water repellent. However, polypropylene has a limited oil absorbing capacity, and is not at all biodegradable. Also, polypropylene is quite expensive to use in the large quantities necessary to deal with major oil spills. Other methods for oil removal include using absorbents containing polyethylene films, magnetic materials in combination with polyurethane, such as polyurethane containing iron powder, magnetic separation with magnetite and maghemite, acoustic energy, ultrasonic energy, in-situ combustion of oil, polyether containing isocynate end groups, solidifiers, demulsifying agents, surface washing agents and dispersants combination polymers such as viscose rayon, polyamide fibers and small rubber adhering to the fibers.

Yet other efforts require using fish scale powder or biosurfactants such as rhamnolipid as an environmentally friendly and potentially economically viable remediation option. Efforts also include finding other biodegradable oil absorbent materials suitable for cleaning up oil spills. Other biodegradation agents including micro-organisms capable of degrading hydrocarbons, liposomes, bacterial mixtures, enzymes, or fertilizers have been proposed, however, only some of these are commercially viable. For example, peat moss has been used for this purpose. However, in the form in which it is obtainable commercially, peat moss contains a significant amount of impurities such as a sand and carbon. Also, peat moss does not float on water well and is limited in its absorption capacity for oil. For example, one pound of peat moss will absorb about five pounds of oil. In addition, peat moss is not totally biodegradable. Organoclay made by a reaction of smectite clay and quaternary ammonium compound have also been used as oil spill remediation agents.

Another substance which has been tested for its oil absorbent capacity in cleaning up oil spills is a seaweed-based product that is normally sold as a soil conditioner. This product is sold under the registered trademark, AFRIKELP, and is comprised of a blend of selected brown seaweeds found off the southern coast of the African continent. However, this product is rather expensive and has a limited oil absorption capability. Biodegradable remedies for removing oil from spills also include using coconut coir pit, dried corn cobs in their natural state or raw cotton. Other chemical dispersants, gelling agents, inorganic clays, foam plastics, booms, skimmers are also well known in the art. These existing methods either utilize non-environmentally friendly materials or are not cost-effective. Further, while many of these methods may remove significant quantities of oil, the oil is not easily recovered or reclaimed for use in industry. Therefore useful biodegradable and environmentally friendly cost effective methods for oil recovery and reclamation from oil spills are desired.

SUMMARY

In one embodiment, a method for recovering a hydrophobic substance in an aqueous solution may comprise the steps of: forming an inverse hydrophobic substance containing envelope; congealing the hydrophobic substance containing envelope in the solution; and precipitating the congealed hydrophobic substance containing envelope. The hydrophobic substance may be a hydrocarbon or more particularly oil.

The forming step may comprise of adding a polysuccinimide to the surface of the aqueous solution. The method may further comprise agitating the aqueous solution, which may occur prior to the congealing step.

Additionally, the method may comprise reclaiming the hydrophobic substance. Reclaiming may comprise the steps of adding a caustic to the envelope to form a water soluable polymer and a hydrophobic substance; and mechanically collecting the hydrophobic substance. The reclaiming step may occur after the congealing step and mechanically collecting may comprise of skimming or vacuuming. Additionally, the caustic may be an alkaline.

DETAILED DESCRIPTION

Figure 1:
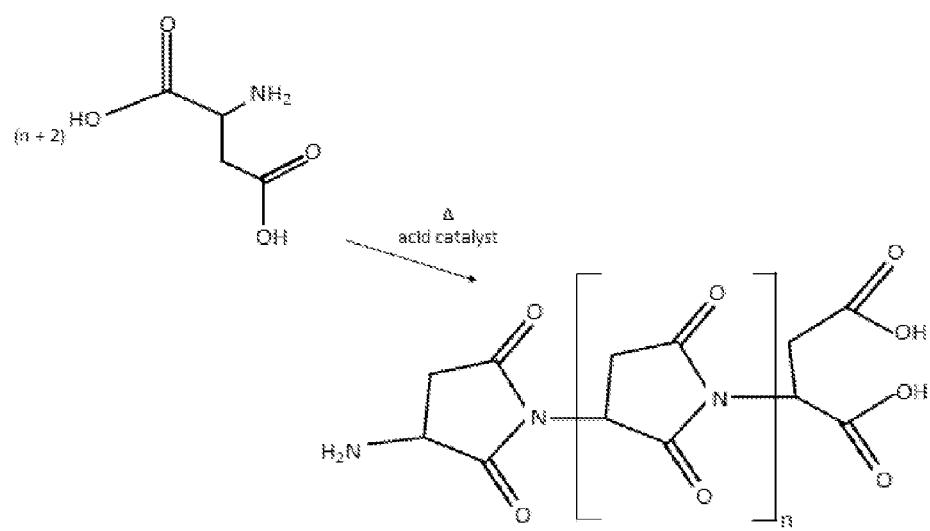
FIG. 1 is a reaction of L-aspartic acid producing polysuccinimide
Figure 2:
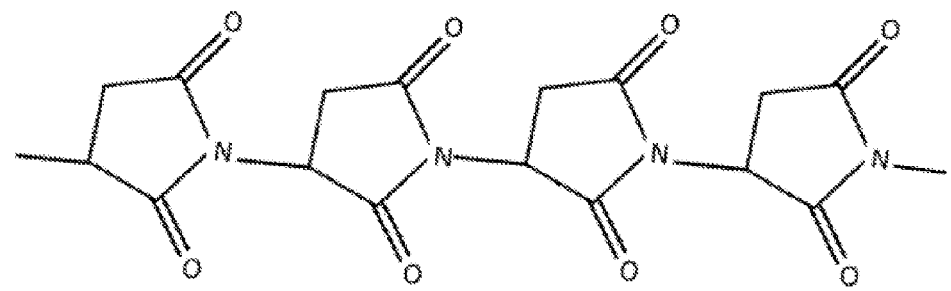
FIG. 2 is a an example form of polysuccinimide

Generally polyamino acids are often used as a model compound of protein in the field of medicine and bio-chemistry. Polysuccinimide is a precursor in the synthesis of polyaspartic acid which is useful as an environmentally suitable and water soluble polymer, and additionally is a useful intermediate in the synthesis of pharmacologically valuable poly-(aspartic acid)-hydroxyalkylamide as disclosed in Japanese Patent Publication SHO 48-20638. Polymers of L-aspartic acid have now shown the ability to adsorb and encase oil effectively removing floating oil from the surface of water.

As to the preparation of polysuccinimide, J. Amer. Chem. Soc., 80, 3361 (1958) discloses a process for conducting heat condensation of aspartic acid at 200.degree. C. for 2.about.3 hours, however, the molecular weight of polysuccinimide obtained by the process is about 10,000. J. Org. Chem., 24, 1662 (1959) discloses a process for conducting heat condensation of a derivative of maleic acid, malic acid or aspartic acid so as to prepare polysuccinimide having a molecular weight of 15,000 to 28,000. However, the process requires a step for synthesis of a derivative as a raw material. J. Org. Chem:, 26, 1084 (1961) discloses a process for heating aspartic acid in tetralin for a long time, however, polysuccinimide obtained by the process has a low molecular weight and remarkable coloring.

U.S. Pat. No. 3,052,855 discloses a preparation process of a copolymer of aspartic acid copolymer or a glutamic acid in the presence of a phosphoric acid, and Japanese Patent Publication SHO 48-20638 discloses a process for carrying out the reaction in the form of a thin layer by using 85% phosphoric acid in a rotary evaporator to obtain high molecular weight polysuccinimide. Although any of these processes leads to polysuccinimide having a high molecular weight, it is disadvantageous to industrialize any of the processes, because the process leads to solidification of the reaction product and thus causes difficulty in stirring and isolating operations and additionally is very difficult to scale up. As a result, the process is unfavorable in industry.

Further, U.S. Pat. No. 4,363,797 discloses a process for conducting polymerization in a high boiling point solvent such as diphenyl ether in the presence of an ion exchange resin. However, polysuccinimide obtained by the process has a molecular weight of about 10,000.

As to a production process of polysuccinimide in industry, it has been known a process for conducting heat condensation in a fluid bed dryer (U.S. Pat. No. 5,057,597), a process for reacting maleic anhydride with ammonia and further heating with polysuccinimide (U.S. Pat. No. 5,219,952), and a process for dehydrating aspartic acid under reduced pressure (U.S. Pat. No. 5,219,986). However, polysuccinimide obtained by these processes has a molecular weight of about 10,000. A high molecular weight product cannot be obtained. U.S. Pat. No. 5,142,062 has described that high molecular weight polysuccinimide can be obtained by conducting heat condensation of aspartic acid under reduced pressure in the presence of a phosphoric acid, successively mechanical comminuting the reaction product and further conducting polymerization.

When polysuccinimide is hydrolyzed with caustic, polyaspartate is produced. Polyaspartates are environmentally friendly, non-toxic and biodegradable. Polysuccinimide is also non-toxic and in an aqueous environment, slowly converts to polyaspartate.

It was discovered that polysuccinimide when applied to oil causes the oil to congeal and then to form an inverse oil containing envelope that is heavier than water and subsequently sinks. The oil envelope can then be recovered and by the application of caustic to trigger the conversion of polysuccinimide to polyaspartate, the original oil is separated and recovered.

The properties of combined oil and water are well-known in the art. Oil is not soluble in water; therefore oil floats on the surface of the water. The oil tends to accumulate in one mass, thus minimizing the surface contact with the water. When agitated, the oil in solution forms spheres which is a shape that minimize the surface contact with the water for any given volume. The smaller the oil sphere, the longer it remains in solution. Eventually the oil returns to the surface and accumulates into a single mass.

Additionally, oil will coat surfaces in contact with the water in order to minimize surface contact with the water. For example, oil in a jar will coat the sides of the container. Detergents and like water soluble substances are known to be useful in removing oil from aqueous environments. However, these tend to be impractical for large bodies of water due to the amount of detergents necessary as the detergents are quickly diluted as the system seeks equilibrium. Not only have polymers of L aspartic acid, one example being polysuccinimide, shown the ability to adsorb and encase oil in aqueous environments, these polymers are water insoluble.

Figure 3A:
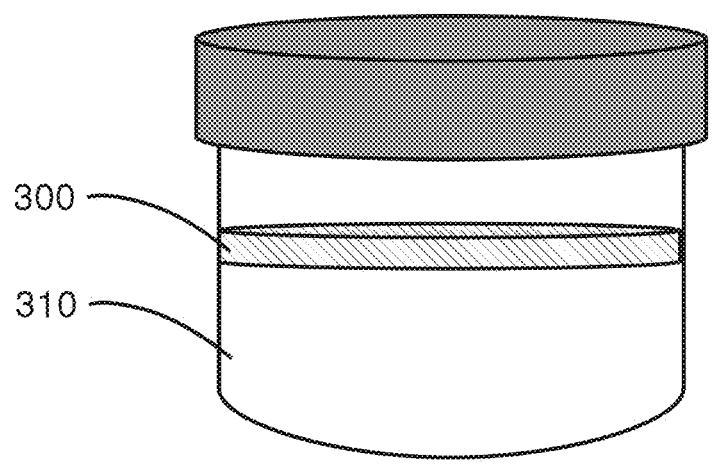
FIGS. 3A-B are illustrations of the properties of a solution of oil and water.
Figure 3B:
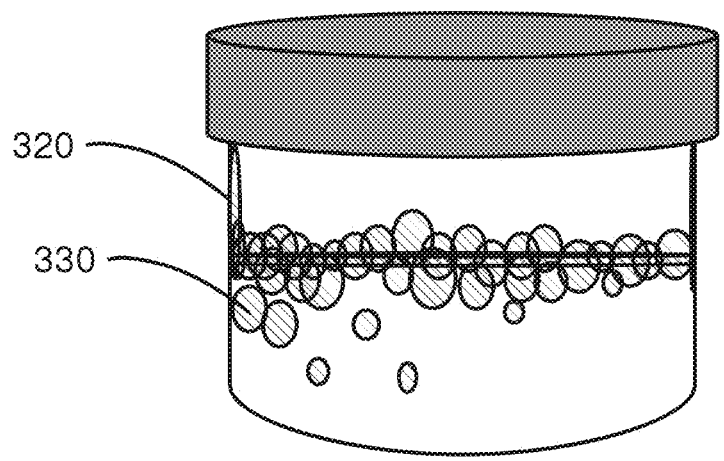

This ability of the L-aspartic acid polymers to adsorb and encase oil has been shown in a series of experiments. These experiments have been performed under normal laboratory conditions using similar set-up. In each case, an amount of sea water, 50 grams, has been measured into a glass lidded container on an electronic balance. To that, 5 grams of light sweet crude oil from the North Sea is added, also using the electronic balance. As seen in FIG. 3A, the oil 300 separates and forms a layer floating atop the sea water 310. The seawater, when agitated by shaking the lidded container, mixes with the oil, as shown in FIG. 3B. The oil gradually forms spheres 330 of varying sizes prior to floating back to the surface to re-form the layer atop the sea water. Some oil is seen to coat the glass sides 340 of the bottle and slowly slides off the surface to rejoin the top oil layer.

In a first example experiment, 50 milliliter (ml) of synthetic sea water was placed in a 250 ml beaker. 1 gram (gm) of BP crude oil was added to the beaker. The oil floated on the surface of the water. 1 gm of polysuccinimide powder was sprinkled on the oil surface. Immediately the oil began to congeal and formed an inverse tear shaped drop that subsequently released and fell to the bottom of the beaker leaving crystal clear water with very little of the oil adhering to the sides of the beaker.

Figure 4:
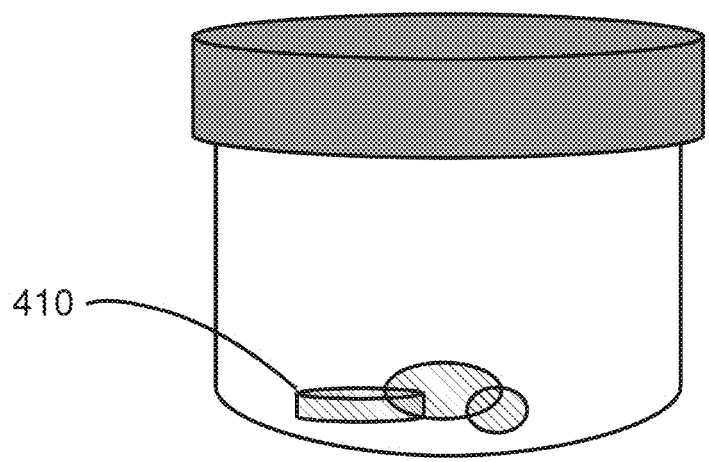
FIG. 4 is an illustration of the sediment resulting from applying polysuccinimide to an oil and sea water mixture.

In a second experiment, 50 ml of synthetic sea water was placed in a 250 ml jar with a cap. 5 gm of BP crude oil was added to the jar. The jar was shaken vigorously and allowed to separate. There was some evidence of a microemulsion due to the natural surfactants in the oil and an adherent oil ring on the glass sides. Increments of 1 gm of polysuccinimide were added up to 5 gm and the contents of the jar shaken vigorously. After the first gram of polysuccinimide was added and the contents shaken, there appeared to be a sludge that formed and the adherent oil ring on the glass side was no longer present. Further, the treated oil rose to the surface and accumulated at a faster rate than the untreated oil. After 2 gm of polysuccinimide were added, there was a definite conversion to a gray sludge 410 that began to sink to the bottom. As subsequent amounts of polysuccinimide were added and the contents shaken, more of the gray sludge 410 would sink as shown in FIG. 4. There were no hard oil deposits on the sides of the jar.

Figure 5:
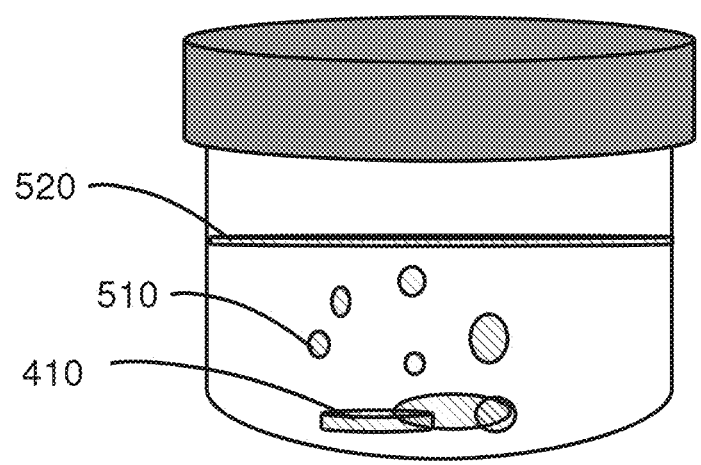
FIG. 5 is an illustration of oil released from a polysuccinimide sediment containing oil.

Moving to FIG. 5, in a third example experiment, a method to recover the oil was examined using the congealed oil 410 that was treated with polysuccinimide in example 1, To this congealed oil 410, several drops of 50% caustic were added. As the polysuccinimide was converted to sodium polyaspartate. Oil 510 was immediately released and reformed a layer 520 on the surface of the water. Agitation of the solution via some mechanical means may accelerate the release process.

The congealed oil/polysuccinimide mass exhibits properties of structural strength. When physically manipulated by mechanical means, the congealed oil mass tends to break into smaller pieces, but does not generally release oil during the process. However, mechanical pressure has been shown to release the captured oil under certain conditions. In one example, a sample of the congealed oil/polysuccinimide mass is sent through a funnel lined with filter paper. In the example case, the mechanical pressures inherent in the filtering process were enough to overcome the structural strength of the polysuccinimide and oil mass. Another example mechanical method to reclaim oil or other similar or dissimilar chemicals recovered from an aqueous may be through a suction process, where an accumulated polysuccinimide and oil mixture is recovered from the ocean floor via a suction process and stored on a surface ship. The mechanical suction process may contain enough mechanical forces to overcome the structural strength of the congealed polysuccinimide and oil mixture.

Figure 6:
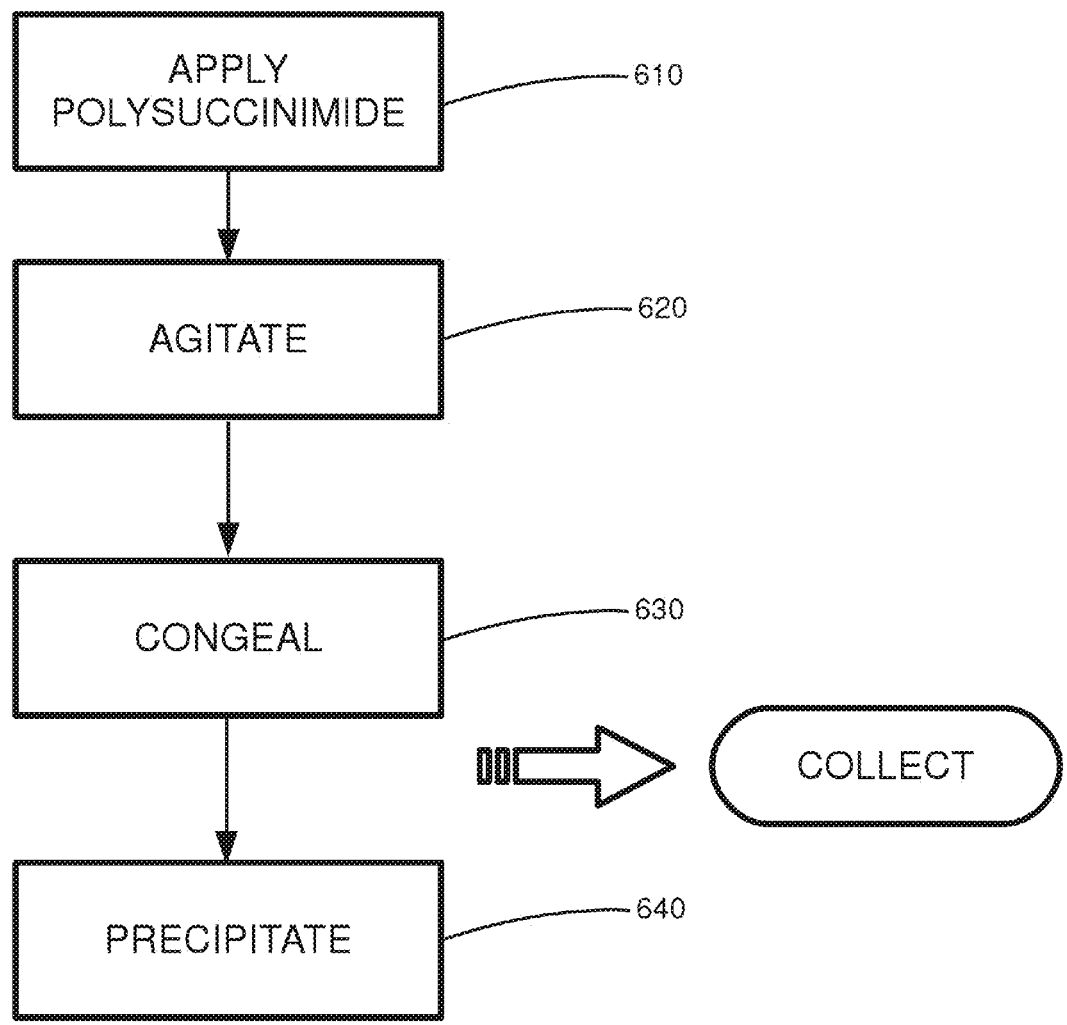
FIG. 6 is an illustration of a sample method to recover hydrocarbons or hydrophobic substances from an aqueous environment.

FIG. 6 depicts an example method to recover oil from an oil spill in an aqueous environment, such as the open ocean. First, a biodegradable polymer such as polysuccinimide is applied to the oil spill 610. This may be accomplished in numerous ways, including being dropped from a helicopter, an airplane or boat. While the application of the polysuccinimide will cause the oil to congeal and initially rise to the surface, agitation of the water and oil accelerates the process 620. Additionally, because polysuccinimide is not soluble in water and will sink, the surface application of polysuccinimide may be an effective way to capture subsurface crude oil and initially bring it to the surface. The oil captured by the polysuccinimide will initially rise to the surface of the water, including releasing from coated surfaces. With further application of polysuccinimide or time for the congealed particles to mass 630, the combined mass will sink 640. The oil/polysuccinimide mass may then be collected by a number of known methods including, but not limited to, skimming or vacuum from the sea bed.

Figure 7:
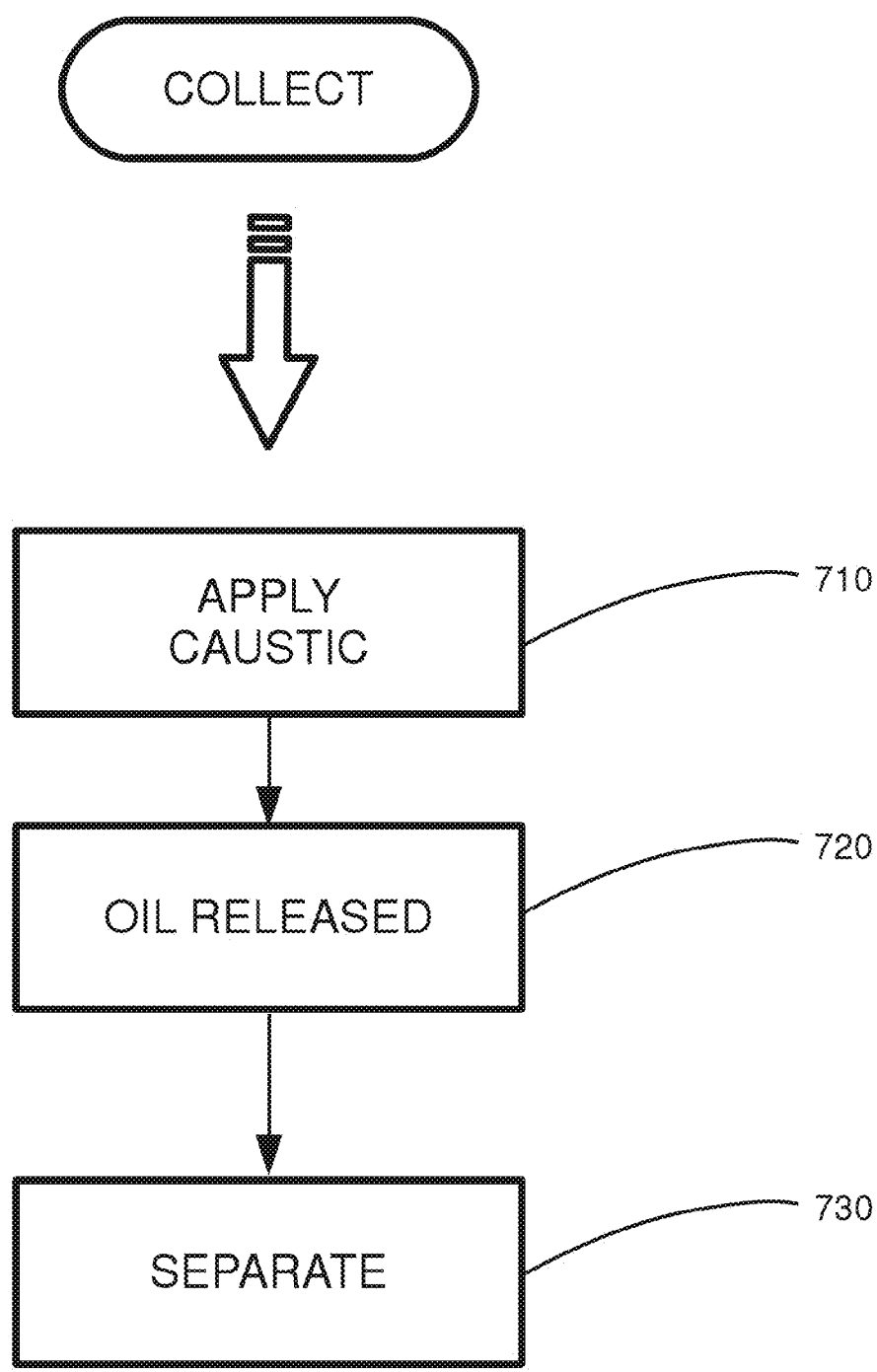
FIG. 7 is an illustration of a sample method to reclaim hydrocarbons or hydrophobic substances recovered from an aqueous environment.

FIG. 7 illustrates a sample method to recover the captured oil from the polysuccinimide once collected. Polysuccinimide is converted to a water soluble polymer with the addition of caustic, (sodium hydroxide NaOH). To begin the reclamation process, caustic is added to the recovered oil/polysuccinimide mass 710. The caustic converts the polysuccinimide to form polyaspartate, as described above. During this conversion process, the oil is released and returns to the surface of the water 720. Once the conversion process is complete, the oil may be reclaimed through any separation process, such as centrifuging, to remove the oil from water 730. The oil may then be stored for further use. Because polyaspartate is fully biodegradable and environmentally friendly, the water may be released then or when the polymer biodegrades fully.

An example mechanical reclamation process would allow recovery of not only the oil or other reclaimed chemical, but also recovery of the polysuccinimide itself. For example, when used to recover hydrocarbons from an aqueous environment, the polysuccinimide is not physically consumed. Polysuccinimide is only slightly reactive to water and not reactive to hydrocarbons, therefore the mechanical recovery would allow the hydrocarbon to be recovered and the released polysuccinimide would then be recoverable for reuse. The polysuccinimide may also be left in place and will slowly hydrolyze to polyaspartate and fully biodegrade.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein. The invention should therefore not be limited by the above described embodiment and method, but by all embodiments and methods within the scope and spirit of the invention as claimed.

What is claimed is:

1. A method for reclaiming hydrocarbons, the method comprising:
    adding a substance comprising polysuccinimide to a location having a hydrocarbon disposed therein;
    adsorbing the hydrocarbon with the substance to form an adsorbed mass;
    precipitating the adsorbed mass;
    collecting the adsorbed mass from the location; and
    recovering the hydrocarbon from the adsorbed mass by hydrolyzing the substance.

2. The method of claim 1, wherein adding a substance comprising polysuccinimide to a location having a hydrocarbon disposed therein includes adding the substance to an aqueous environment.

3. The method of claim 1, wherein adding a substance comprising polysuccinimide to a location having a hydrocarbon disposed therein includes adding the substance to fresh water.

4. The method of claim 1, wherein adding a substance comprising polysuccinimide to a location having a hydrocarbon disposed therein includes adding the substance to a lake.

5. The method of claim 1, wherein adding a substance comprising polysuccinimide to a location having a hydrocarbon disposed therein includes adding the substance to salt water.

6. The method of claim 1, wherein adding a substance comprising polysuccinimide to a location having a hydrocarbon disposed therein includes adding the substance to an ocean.

7. The method of claim 1, wherein adding a substance comprising polysuccinimide to a location having a hydrocarbon disposed therein includes adding the substance to a solid surface.

8. The method of claim 1, wherein the hydrocarbon includes crude oil or one or more components of crude oil.

9. The method of claim 1, wherein recovering the hydrocarbon from the adsorbed mass by hydrolyzing the substance includes hydrolyzing the polysuccinimide to form polyaspartate.

10. The method of claim 1, wherein hydrolyzing the substance includes hydrolyzing with a caustic.

11. The method of claim 10, wherein the caustic includes sodium hydroxide.

12. A method for reclaiming spilled hydrocarbons, the method comprising:
    adding a polysuccinimide powder to a surface having a hydrocarbon spilled thereon;
    adsorbing the hydrocarbon with the polysuccinimide powder to form an adsorbed mass;
    precipitating the adsorbed mass;
    collecting the adsorbed mass from the surface; and
    recovering the hydrocarbon from the adsorbed mass by hydrolyzing polysuccinimide from the polysuccinimide powder to form polyaspartate.

13. The method of claim 12, wherein adding a polysuccinimide powder to a surface having a hydrocarbon spilled thereon includes adding the polysuccinimide powder to an aqueous environment.

14. The method of claim 12, wherein adding a polysuccinimide powder to a surface having a hydrocarbon spilled thereon includes adding the polysuccinimide powder to fresh water.

15. The method of claim 12, wherein adding a polysuccinimide powder to a surface having a hydrocarbon spilled thereon includes adding the polysuccinimide powder to salt water.

16. The method of claim 12, wherein adding a polysuccinimide powder to a surface having a hydrocarbon spilled thereon includes adding the polysuccinimide powder to a solid surface.

17. The method of claim 12, wherein the hydrocarbon includes crude oil.

18. The method of claim 12, wherein hydrolyzing polysuccinimide from the polysuccinimide powder to form polyaspartate includes hydrolyzing with a caustic.

19. The method of claim 18, wherein the caustic includes sodium hydroxide.

20. A method for cleaning oil spills in the ocean, the method comprising:
    adding a polysuccinimide powder to an oil spill along an ocean;
    adsorbing oil from the oil spill with the polysuccinimide powder to form an adsorbed mass;
    precipitating the adsorbed mass;
    wherein precipitating the adsorbed mass includes precipitating the adsorbed mass to a bottom surface of the ocean
    collecting the adsorbed mass from the bottom of the ocean; and recovering oil from the adsorbed mass by hydrolyzing polysuccinimide from the polysuccinimide powder to form polyaspartate.

* * * * *